United States Patent
Wideman et al.

[11] Patent Number: 6,128,548
[45] Date of Patent: Oct. 3, 2000

[54] TOOL-SPECIFIC CONTROL FOR CAROUSEL FOAM MOLDING SYSTEM

[75] Inventors: George Wideman, Redford; James D. Sclabassi, Novi, both of Mich.

[73] Assignee: Lear Corporation, Southfield, Mich.

[21] Appl. No.: 09/074,787

[22] Filed: May 8, 1998

[51] Int. Cl.$^7$ .................................................. B29C 39/00
[52] U.S. Cl. ......................... 700/197; 700/201; 700/97
[58] Field of Search .................................. 700/197, 200, 700/201, 117, 95, 90, 97, 99, 103, 105, 118, 119, 159, 160, 169, 172, 173, 174, 179, 180

[56] References Cited

U.S. PATENT DOCUMENTS

| | | | |
|---|---|---|---|
| 4,421,468 | 12/1983 | Bokelmann | 425/143 |
| 4,508,499 | 4/1985 | Spengler | 425/88 |
| 5,016,184 | 5/1991 | Gutjahr | 364/475.05 |
| 5,062,052 | 10/1991 | Sparer et al. | 364/475.02 |
| 5,216,617 | 6/1993 | Kamiguchi et al. | 364/457.06 |
| 5,229,952 | 7/1993 | Galloway et al. | 364/475.05 |

*Primary Examiner*—Joseph E. Palys
*Assistant Examiner*—Rita Ziemer
*Attorney, Agent, or Firm*—Brooks & Kushman P.C.

[57] ABSTRACT

A tool control for operating a tool in a mulitple station foam injection station including a central controller which is configured to use a first set of inquiry signals and a first set of control signals to monitor and control a standard tool, the tool control being configurable for interfacing with the central control and operating a nonstandard tool. The tool control includes at least one input for receiving a first set of inquiry signals and a first set of control signals from the central control, at least one input for receiving signals from the tool indicating current selected conditions of the tool, at least one output to the tool to actuate at least one selected component of the tool, at least one output for transmitting signals to the central control, and control logic for intercepting the first set of control signals from the central controller, generating a second set of control signals to activate at least one selected component of the tool, and transmitting response signals to the central control corresponding to the first set of inquiry signals, as required, to confirm the status of the standard preselected conditions monitored by the central control.

11 Claims, 10 Drawing Sheets

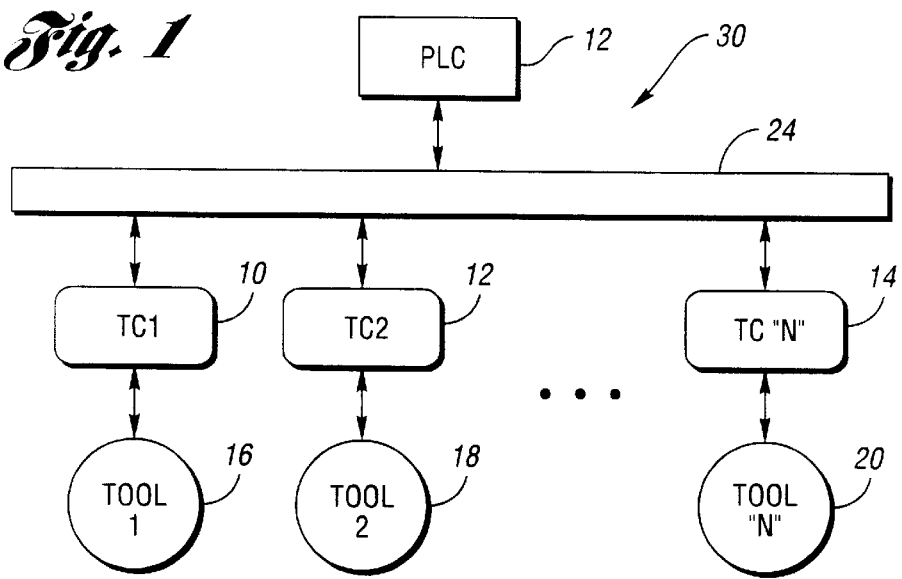
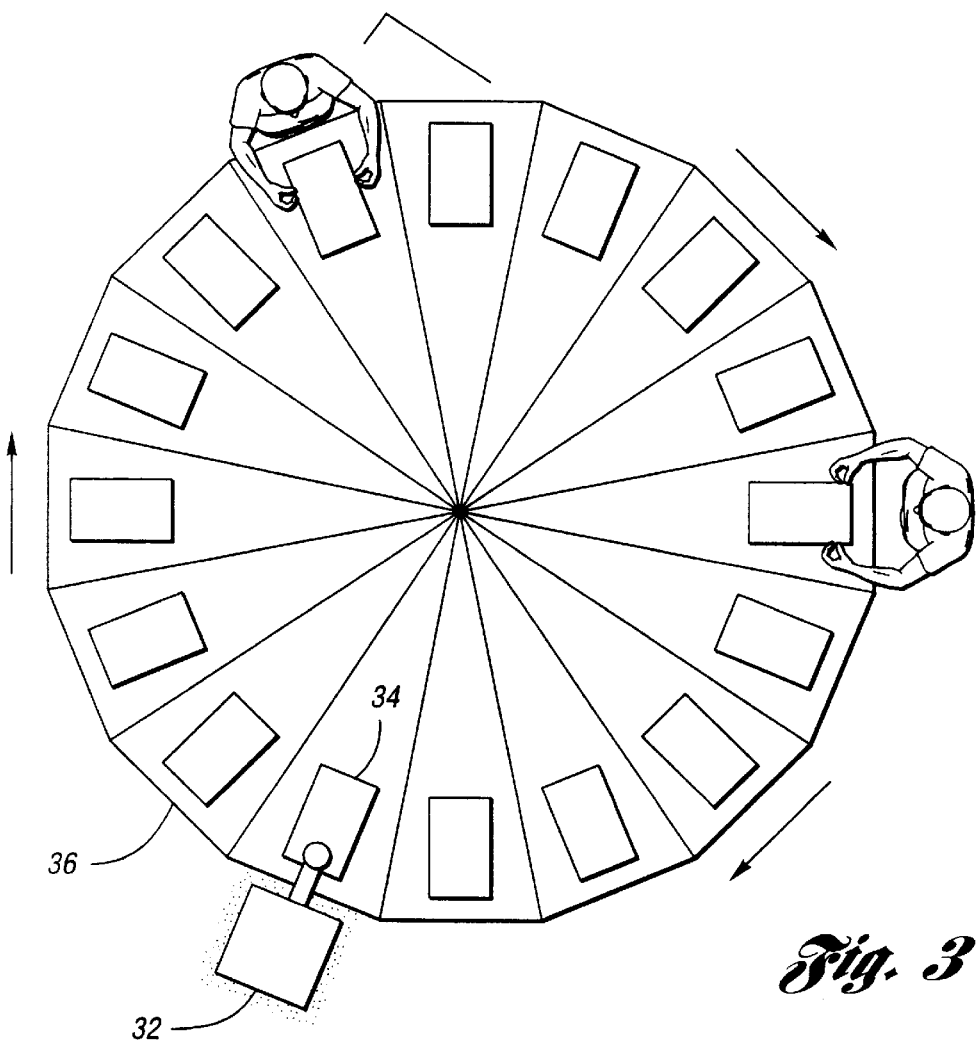

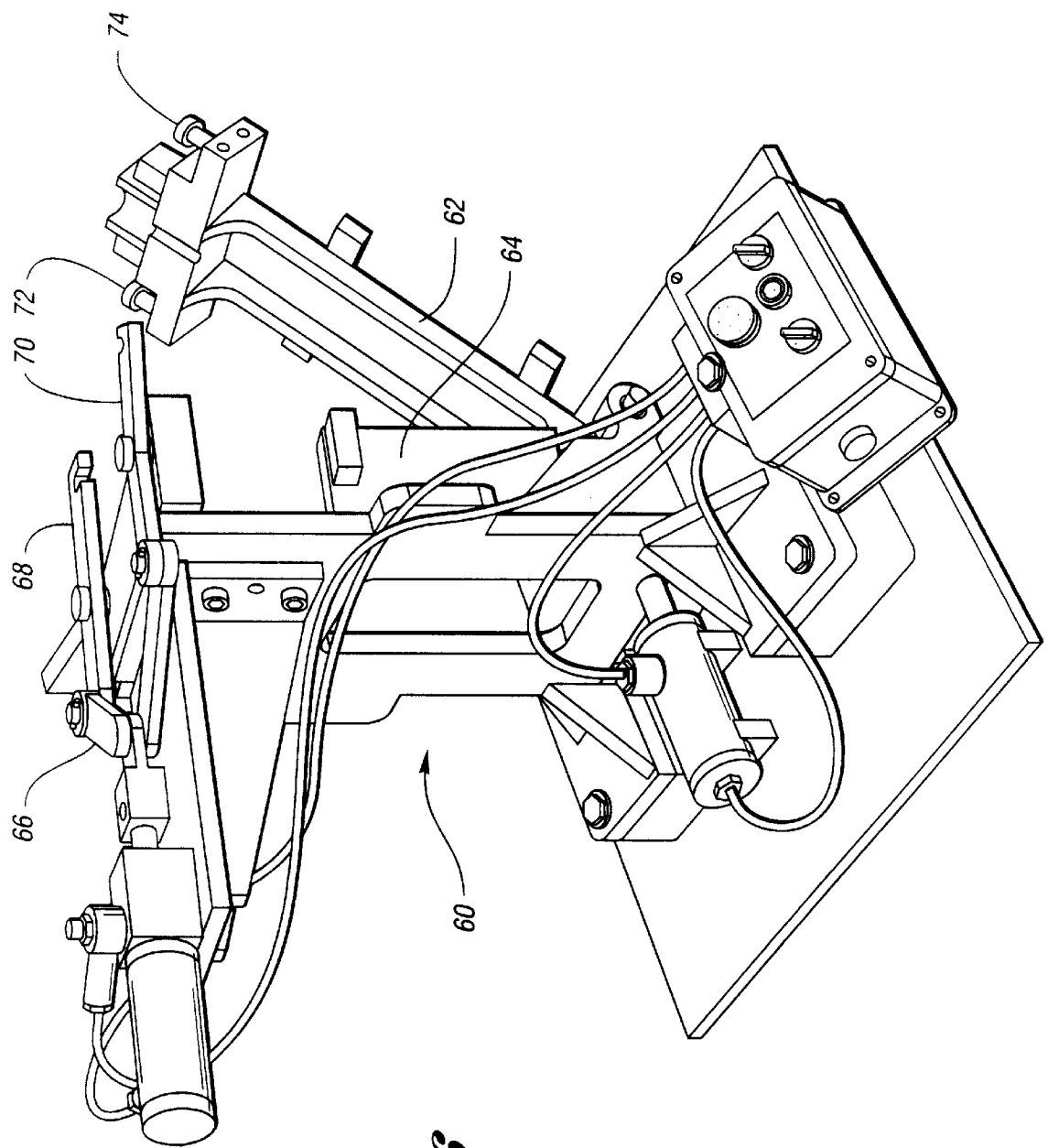

TOOL-SPECIFIC CONTROL FOR CAROUSEL FOAM MOLDING SYSTEM

TECHNICAL FIELD

The present invention relates to a programmable tool control for operating a tool and interfacing with a central controller in a multiple station foam injection machine.

BACKGROUND ART

Various types of foam products, such as automotive headrests and armrests, may be fabricated on multiple station foam injection machines. One type of foam injection machine employs a foam head and an indexing carousel containing up to 36 tools having predefined cavity shapes and controllable components for accepting a predetermined amount of a selected foam from the foam head, and maintaining the foam under pressure within the tool cavity until it cures into a desired shape.

In one multiple station foam injection molding process, referred to as "foam-in-place", a component cover, typically made of suitable cloth, vinyl, or leather, is placed in the cavity in each of the tools, and the foam is injected into the envelope defined by the cover within the tool. The foam then cures inside the cover, and the covered, foamed product is removed from the tool.

Multiple station foam injection machines typically employ a central controller, such as a programmable logic controller (PLC), which monitors the position of each of the tools on the indexing carousel, monitors a set of preselected conditions for each of the tools, and transmits control signals, as needed, to operate a predefined number of controllable components in each tool before and after foam injection, as well as to initiate the foam pour when appropriate for each tool.

The central PLC is programmed to monitor a specific standard set of conditions, and to transmit control signals to initiate a standard set of actuable component operations on each of the up to 36 tools on the carousel.

It is occasionally desirable to include at least one tool in a multiple station carousel which is nonstandard (i.e., it has a different number and/or type of actuable components, different component movements, different timing, or other different process requirements), such as a tool for a prototype or limited production part. It is normally impractical to reprogram the PLC to expand the capability of a specific nonstandard tool without wiring changes or complex programming changes.

DISCLOSURE OF INVENTION

It is therefore an object of the present invention to provide a tool control which interfaces with a programmable logic controller (PLC), or central controller of a multiple station foam injection machine and which may be programmed to capture the control signals from the PLC and generate the expected reply to the PLC, while in the meantime causing the tool to perform as needed, and, where appropriate, independently of the standard operations controlled by the PLC.

It is yet another object of the present invention to provide a tool control which is configurable to interface with the central controller of a multiple station foam injection machine by receiving a standard set of inquiries and control signals from the central controller, and transmitting the expected replies to assure the central controller that the standard set of conditions and standard tool motions are occurring, while independently generating a tool-specific set of outputs necessary to operate a nonstandard tool.

It is yet another object of the present invention to provide a tool control for a multiple station foam injection machine having a central controller, wherein the tool control is easily configurable to accept the standard set of control signals from the central controller and selectively ignore certain of the control signals and/or activate other tool-specific control signals as desired for a particular associated nonstandard tool.

In carrying out the above and other objects, the tool control of this invention includes at least one input for receiving a first set of inquiry signals and a first set of control signals from the central controller, at least one input for receiving signals indicating current selected conditions of the tool, at least one output to the tool for activating selected components as required to facilitate the foam injection at the tool, at least one output for transmitting signals to the central controller as required to confirm the status of the selected tool conditions, and control logic for intercepting inputs from the central controller, generating a second set of control signals for the tool, and generating the responses to the first set of inquiry signals received from the central controller.

In one embodiment of the invention, the central controller is a programmable logic controller (PLC), which is configured to monitor a first set of conditions associated with a standard tool configuration, and to issue a first set of control signals to operate the standard tools. All information, except for "part present", is shared over a common bus which is strobed by the PLC to alert a particular tool at selected times to connect to the bus lines for communication.

The tool control employs a series of relays which provide a path to direct the control signals from the PLC, where appropriate, to the tool. The tool control can be programmed to transmit or ignore standard motion signals by placement of jumpers, as well as re-direct control signals transmitted by the central controller to indicate a standard tool motion to instead effectuate a nonstandard motion required by the specific tool. For example, a particular standard motion signal can be ignored (i.e., not transmitted to a particular tool) by not installing a jumper from the appropriate relay to the appropriate output to a solenoid on the tool.

Responses from the tool control to the PLC from the tool control may be programmed by either connecting the appropriate limit switch across the appropriate pair of "Limit or Jumper" terminals. If no limit switch is available, such as in the case where a request for motion is to be ignored for a particular tool, a jumper can be placed across the appropriate pair of terminals to generate an automatic response and thereby transmit the signal expected by the PLC even though the particular motion was not effected for this nonstandard tool.

The tool control of the present invention also allows for a switch or push-button to be connected directly to the suitable output to allow for manual control of an actuable component on the tool. In manual mode, no automatic signals are seen or sent, but the positions, as required by the PLC while in the automatic mode, are updated.

Thus, the tool control of the present invention provides the capability for quickly and easily configuring the control for a simple, nonstandard tool by selective placement of a series of jumpers across the terminals across one or more appropriate control relays on the board. Once configured, the board receives inquiries and control signals corresponding to a standard tool configuration, transmits the control signals to the tool, or ignores the control signals as required for the specific tool, transmits other control signals as required, and returns verification signals to the PLC as required by the PLC, regardless of any differences in the operation or control of the specific tool. It will be appreciated that the tool control of the present invention provides a quick and easy interface which allows for a nonstandard tool to be run on a multiple tool injection molding system without the need for making any wiring changes or programming changes to the central controller. In addition, this design is easily configurable for a variety of specific tools, as well as for use with standard tools.

The objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic view of a control for a multiple station foam injection machine including the tool control of the present invention;

FIG. 3 is a diagram illustrating a multistation carousel and a single foam injection head;

FIG. 6 is a perspective view of a nonstandard tool with which the tool control of the present invention may be employer;

BEST MODE FOR CARRYING OUT THE INVENTION

Figure 2:
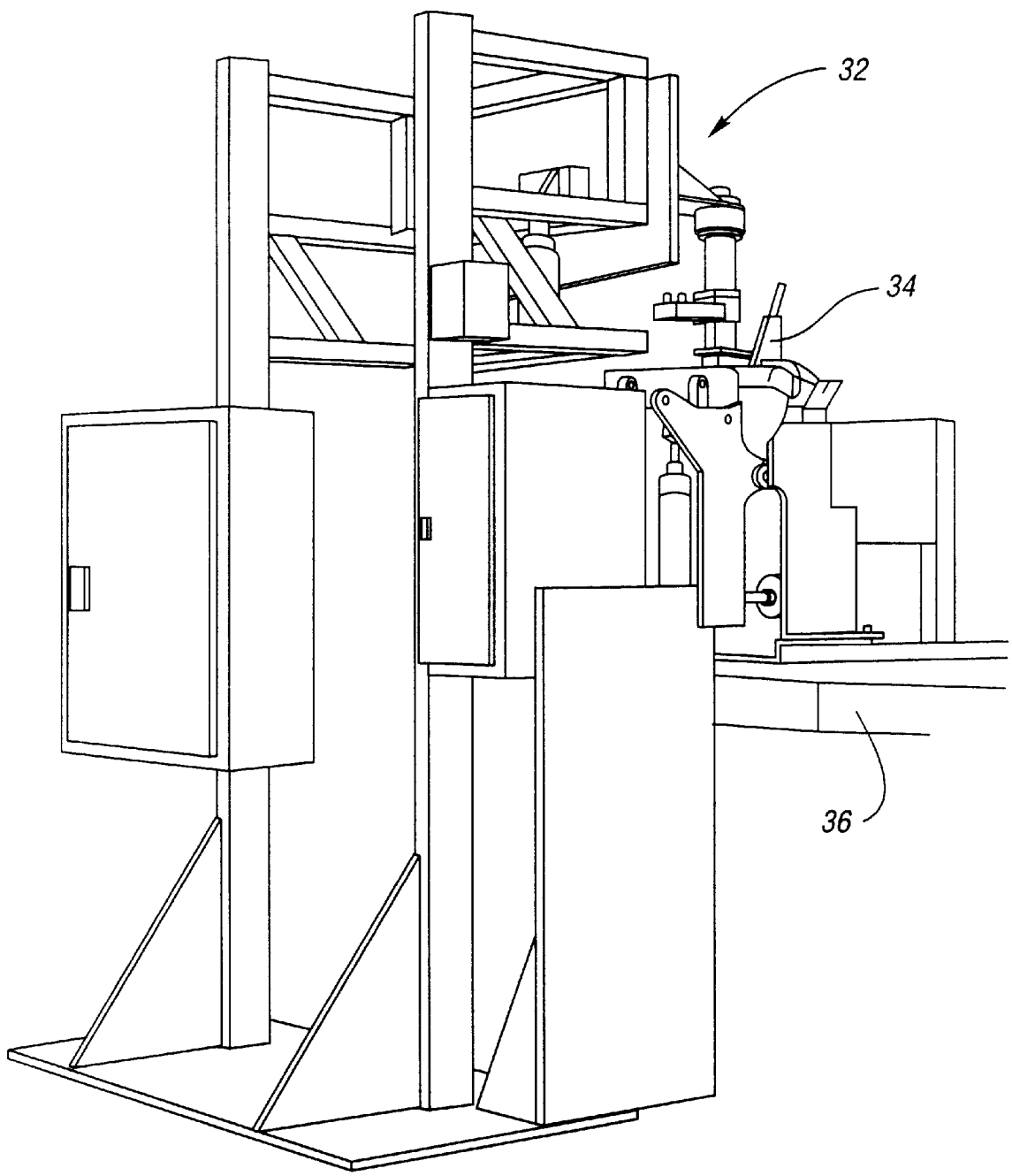
FIG. 2 a perspective view of a tool positioned under the foam injection head.

Referring to FIG. 1 of the drawings, one or more tool controls 10, 12, 14 according to the present invention may each be associated with a particular one of a series of tools 16, 18, and 20 in a multistation machine such as a multiple tool carousel foam injection system. The tool controls 10, 12 and 14 are integrated in a control system, generally designated as 30, which employs a central controller, such as programmable logic control (PLC) 22 via a two-way communication link, such as a common multiple wire bus 24 to allow the central controller to monitor the position of the tools, as well as monitor a first set of conditions relating to actual components, foam injection times, or other selected tool conditions for each of the tools, in order to facilitate automatic foam injection of parts using the tools in a multiple station machine. The PLC 22 is configured to monitor a first set of tool conditions, foam injection times, and other requirements associated with a typical tool (hereinafter also referred to as a "standard tool"). The PLC 22 is also programmed to transmit a first set of control signals to each of the tools 16, 18 and 20 to a control a first set of movable components on the tools prior, during, and/or after foam injection. A tool control 10 associated with a particular tool 16 is employed to intercept the condition inquiry and control signals transmitted from the PLC 22. In the case where tool control 10 is associated with a standard tool, the tool control transmits signals corresponding to the first set of tool conditions monitored by the PLC to confirm the status of these conditions to the PLC. When the PLC transmits a control signal, for example, to open the door of the tool, this signal is transmitted to the tool without modification. Any of the tool controls 10, 12 and 14 may be configured to control a nonstandard tool. In that case, the tool control again intercepts the inquiry signals from the PLC for that tool. If the inquiry signal is inquiring about the condition of a component (e.g., Is door open?) found on the nonstandard tool, the tool control response to the inquiry based upon inputs from the tool indicating the condition of the door. If the inquiry relates to the condition of a component that is not found on this nonstandard tool, the tool control generates and transmits the response expected by the PLC. Thus, the PLC receives information indicating, for example, that the component has been activated and is ready for injection, even though the component does not exist on the nonstandard tool. Thus, the tool control of the present invention provides an interface between the PLC, which is programmed to monitor and control a standard tool, and a nonstandard tool, wherein the nonstandard control signals are generated at the tool control level, independent of the PLC.

FIGS. 2 and 3 illustrate a foam injection head, tool, and multistation carousel which typically utilizes the control system of FIG. 1. The foam injector station 32 may be any type of commercially available injector. In one embodiment, the injector is suitable for injecting two-component, expanding foam for fabricating foam cushions such as are utilized in automotive headrests or armrests. A tool 34 is shown at the injection position. The tool is mounted on an indexing carousel 36 along with a plurality (typically up to 35) other tools. Various operations (as described in detail in connection with FIGS. 5A–5H) are performed at selected points on the carousel 36 to prepare the tool for the foam injection, as well as to remove the injected part after injection.

In the embodiment illustrated in FIG. 1, an Allen-Bradley Model No. SLC 5/03 programmable logic controller is utilized as the central controller.

It will be appreciated that the control system of FIG. 1 may be employed with other multiple station machines to obtain the advantages of the present invention, i.e., controlling nonstandard tools in a multiple tool machine without reprogramming a central controller that is programmed to monitor and control a standard set of conditions and operations associated with other, standard tools.

Figure 4:
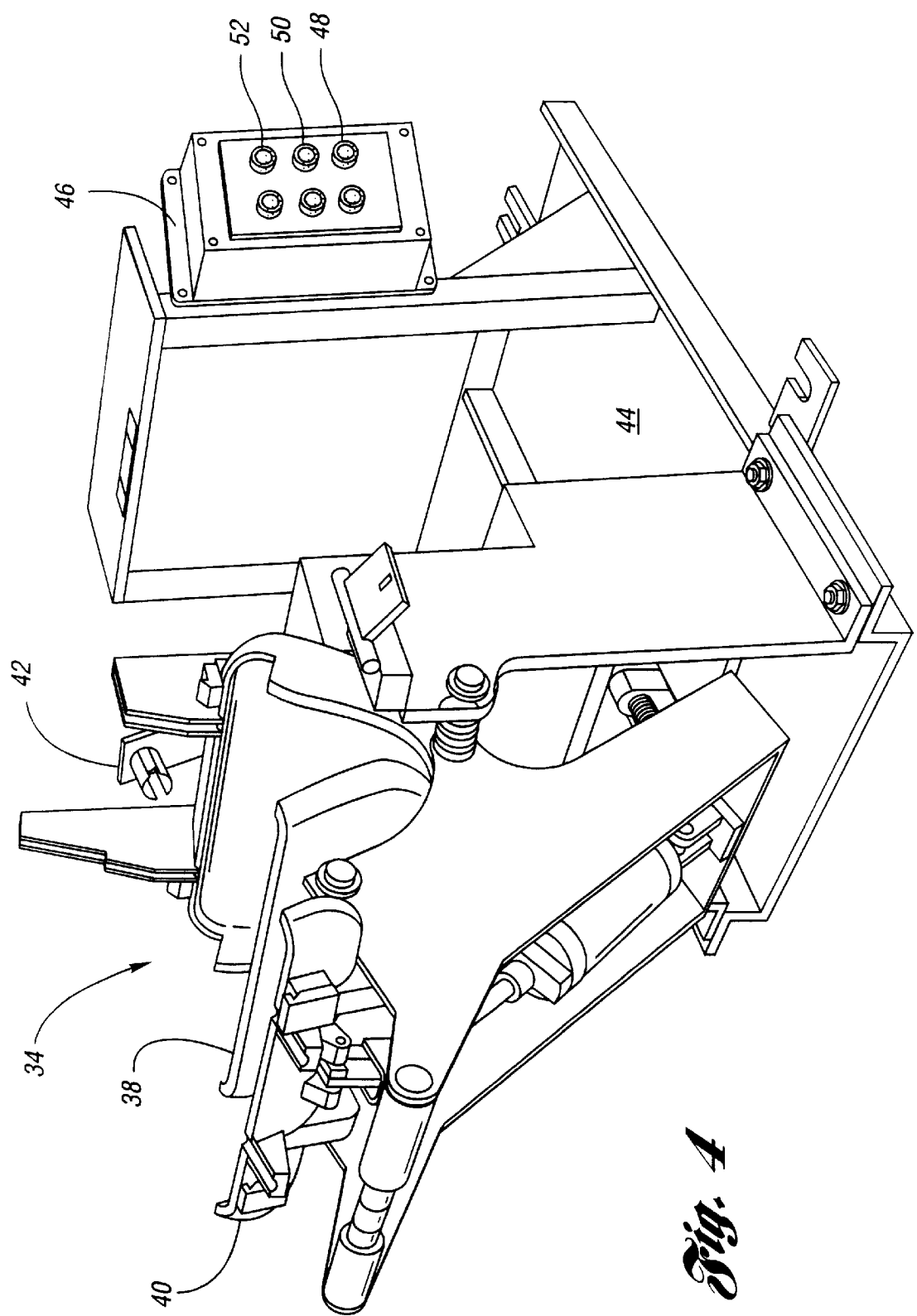
FIG. 4 is a perspective view of a standard headrest tool.

FIG. 4 illustrates the "standard" tool 34 for which the PLC is programmed in one embodiment of the present invention. This tool, utilized for foam-in-place production of a headrest, employs a tool including a door 38 which is movable between an open and closed position, a trap 40, also movable between an open and closed position, and a dog 42 which is movable to swing from a clearance position (shown in FIG. 4) to an injection position to facilitate entry of the foam injection or pour, head into the mold during injection. The tool stand 44 may also include a control box 46 in which the tool control 10 is mounted, and on which a plurality of manual control buttons 48, 50 and 52 are mounted for access and operation by an operator.

Figure 5A:
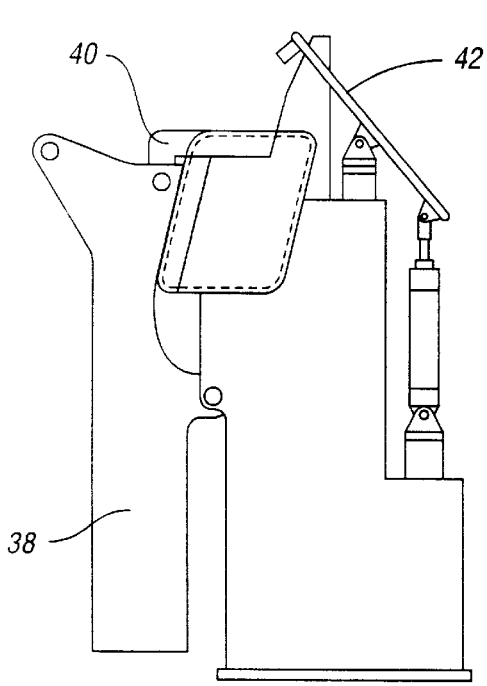
FIG. 5A–5H illustrate the operating sequence for a standard headrest tool.
Figure 5B:
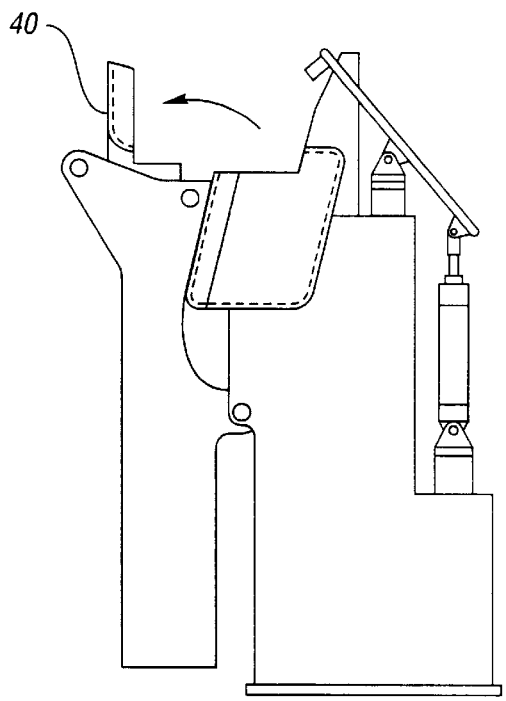
Figure 5C:
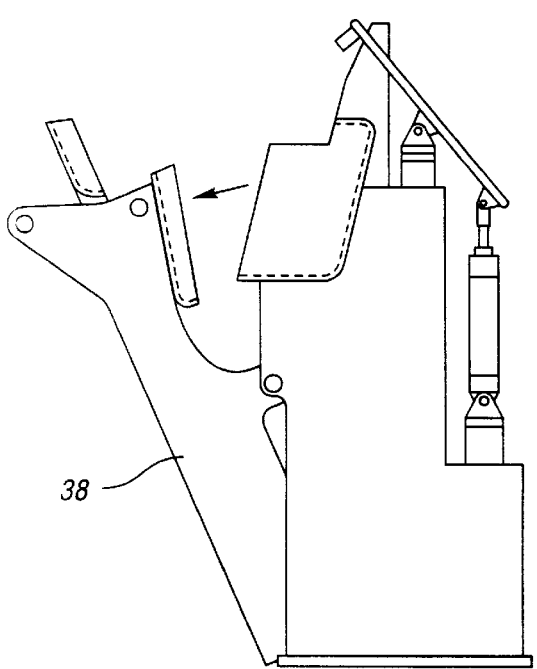
Figure 5D:
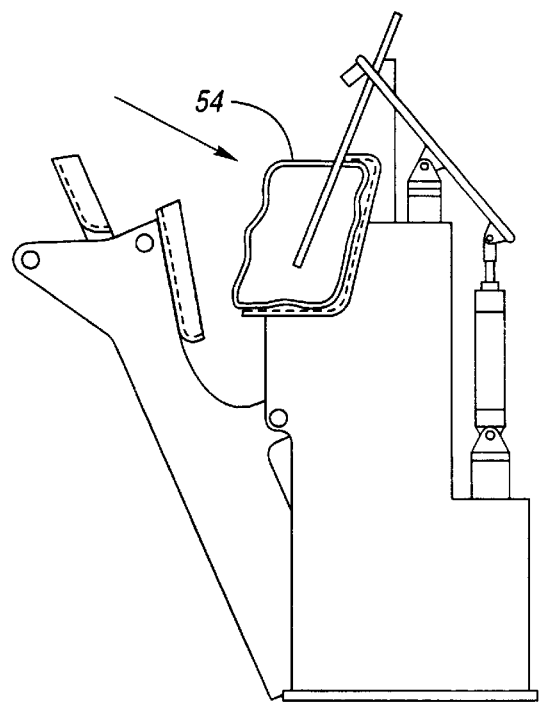
Figure 5E:
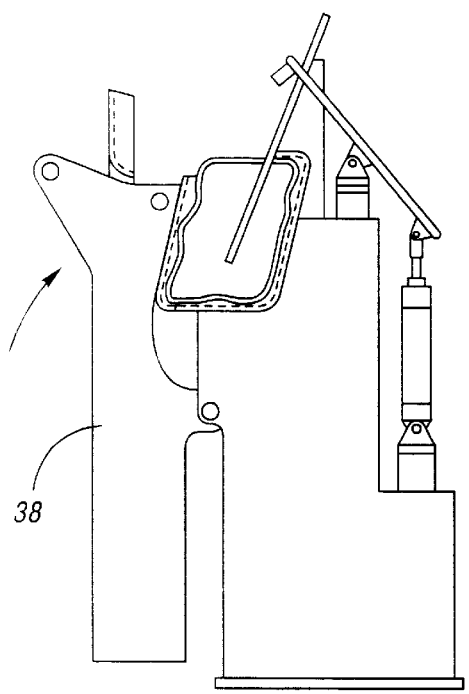
Figure 5F:
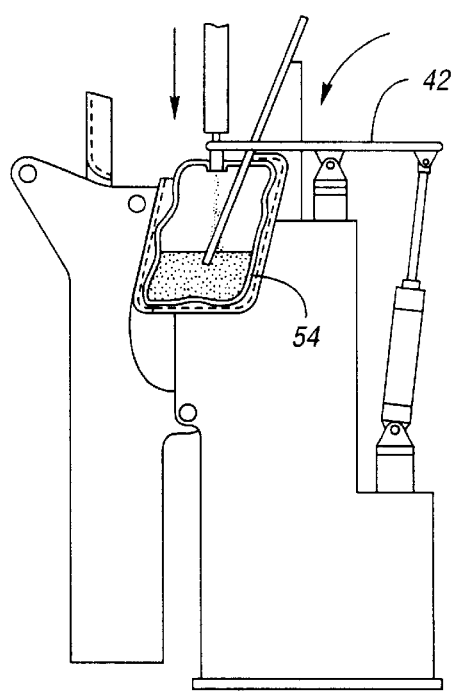
Figure 5G:
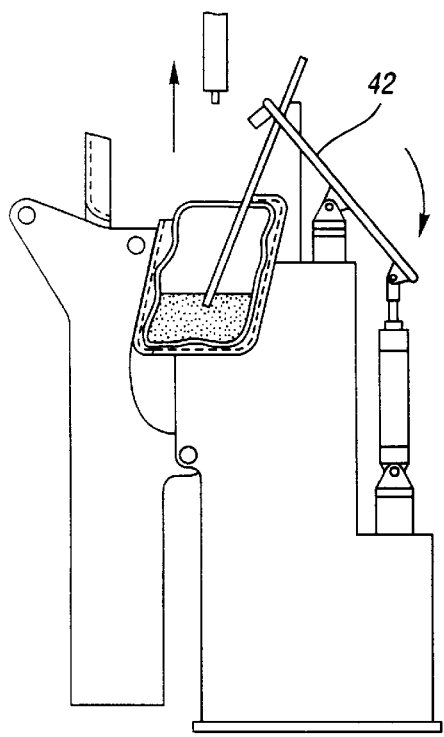
Figure 5H:
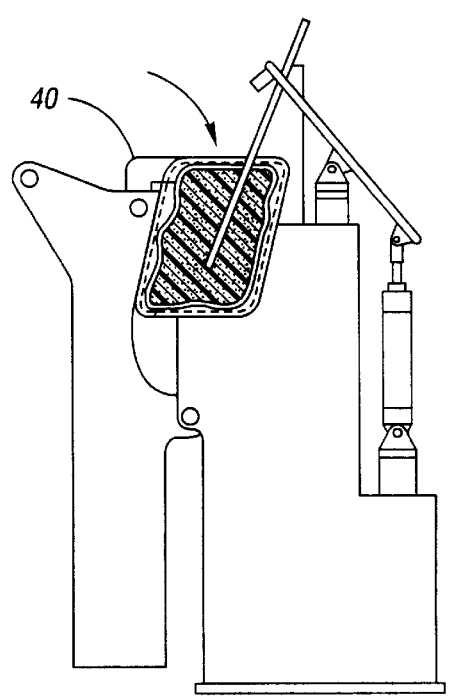

FIGS. 5A–5H illustrate the process employed in one embodiment of the present invention to facilitate foam-in-place injection of headrests using standard tool 34. FIG. 5A illustrates the mold 34 with the door 38 in the closed position, the trap 40 in the closed position, and the dog 42 in the closed position. In FIG. 5B, the central controller has transmitted a signal to open the trap 40. In FIG. 5C, the control has transmitted a signal to open the door 38. In this condition, a headrest (not shown) previously molded in this tool may be removed. In FIG. 5D, a cover 54 is placed within the mold cavity by the operator. In FIG. 5E, the central controller transmits a control signal to close the door, and the door is closed. Prior to injection, the central controller typically inquires as to the status of the door 38, the dog 42, and the trap 40. To ensure that the door is closed, the trap is opened and the dog is opened in preparation for injection. At FIG. 5F, the central controller has transmitted a signal to effect the opening of the dog 42 and, when the tool is indexed to the pour position under the pour head, or pour spout, the head is inserted into the dog and the foam injected in the envelope defined by the cover 54 inside the tool cavity. At FIG. 5G, the central controller has transmitted a control signal to close the dog 42 and, once receiving confirmation that the dog is open, lifts the pour head to a clearance position to allow for indexing of the carousel. At FIG. 5H, the central controller issues a control signal to close the trap 40 to seal the tool cavity, thereby providing for controlled expansion of the foam inside the tool to achieve the desired headrest size and shape. The process repeats, beginning again at FIG. 5A as the tool travels in its cycle on the carousel.

FIG. 6 illustrates a nonstandard tool 60 with which the tool control of the present invention may be implemented. Tool 60 includes an elongate door 62 which, when closed against the main body 64, defines an elongate cavity suitable for forming a foamed-in-place vehicle seat armrest. A locking mechanism 66 includes a pair of locking arms 68 and 70 which engage a corresponding pair of locking pins 72 and 74 on the tool door 62 when the door is closed and the locking arm 66 is moved to the "clamp" position. Thus, unlike the standard tool, tool 60 does not have a "trap" door, and does not utilize a dog to facilitate insertion of the pour head. However, as hereinafter explained in further detail, the tool control of the present invention may be employed to operate this nonstandard tool while providing timely feedback to the PLC that the standard conditions exist for automatic foam injection. In effect, the PLC is "fooled" into thinking it is controlling, and monitoring the operation of, a standard tool.

Figure 7:
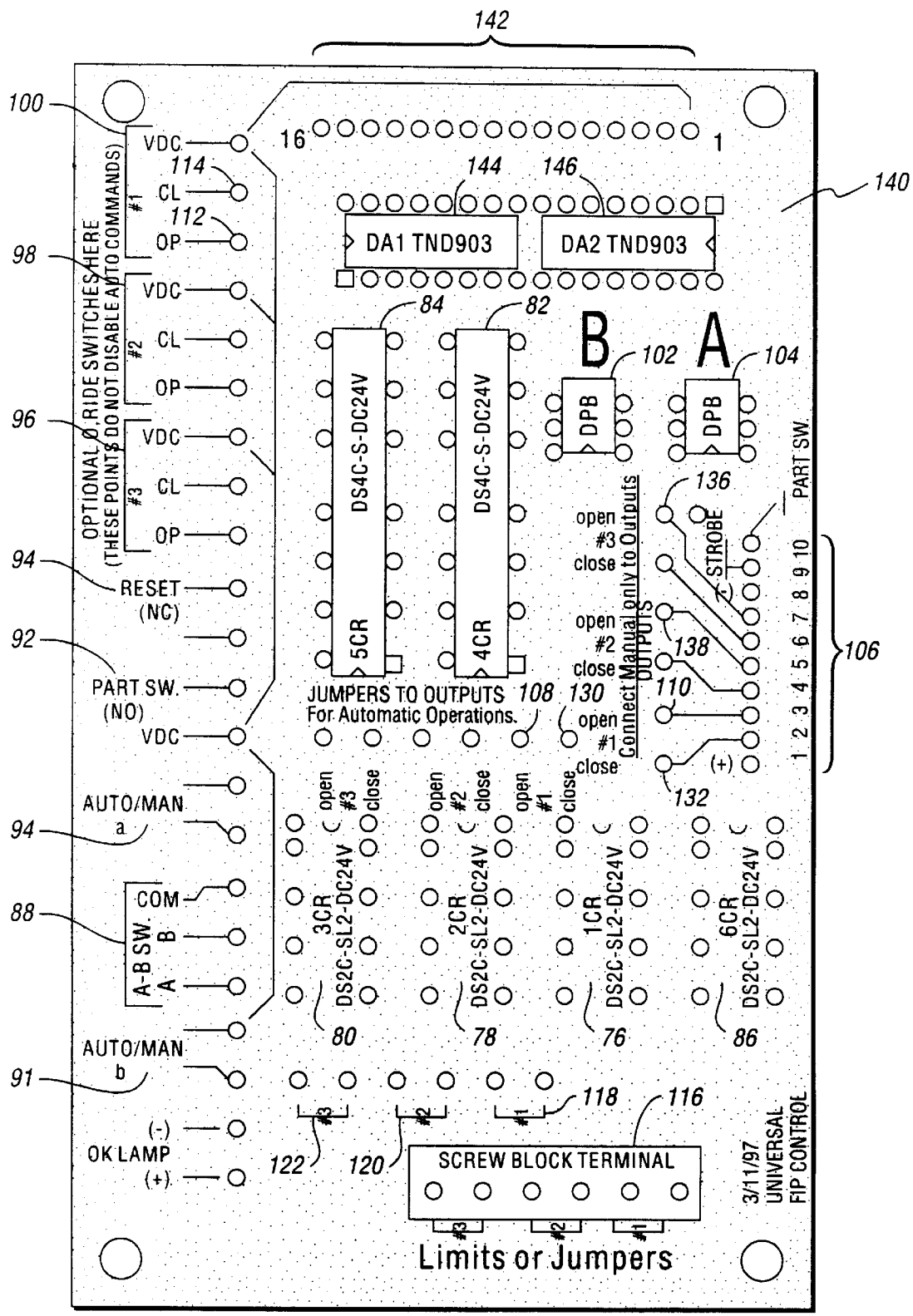
FIG. 7 is a schematic of a circuit board including a tool control of the present invention.
Figure 8:
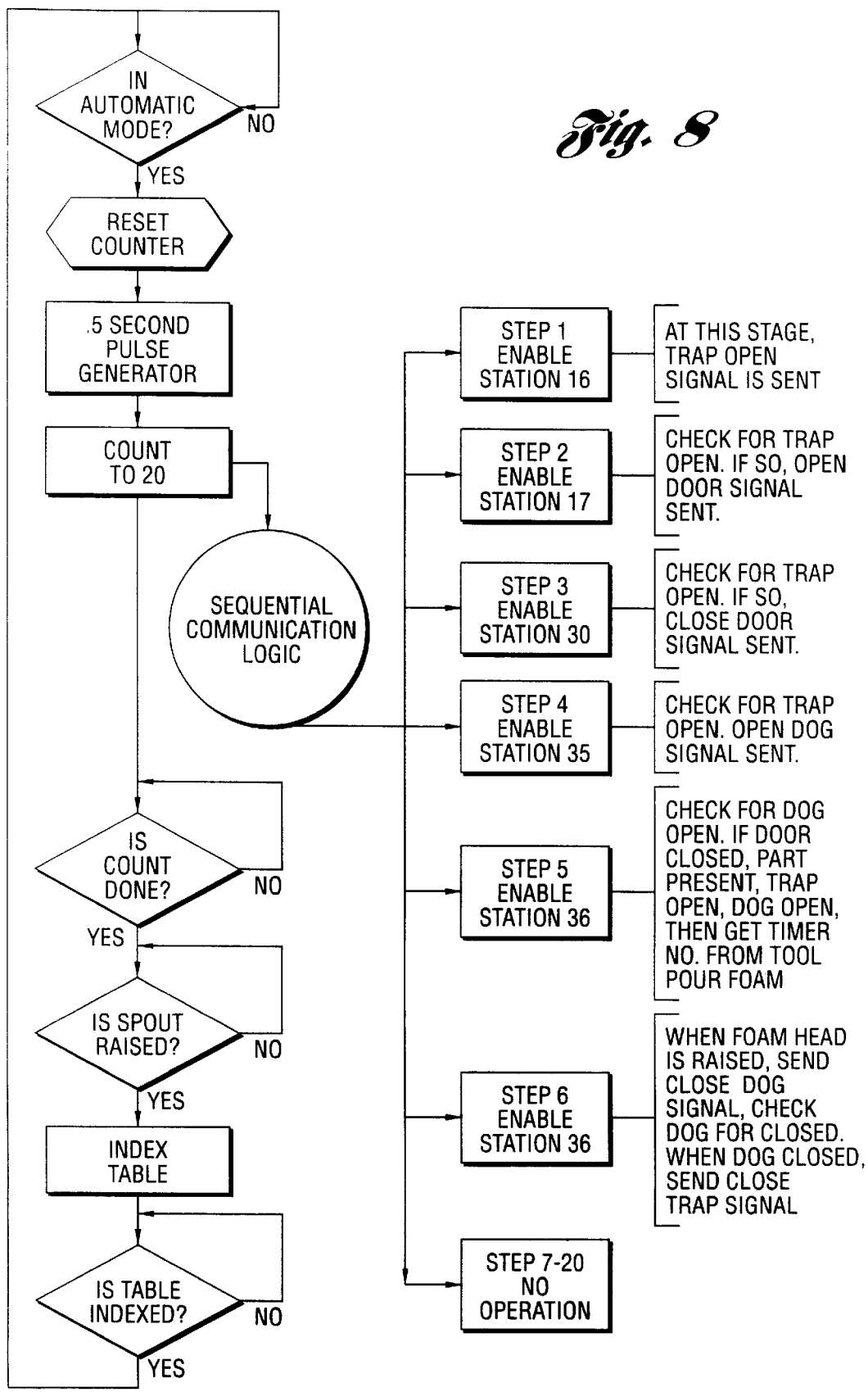
FIG. 8 is a flow chart of the processing sequence of a central controller configured for a standard tool.
Figure 9:
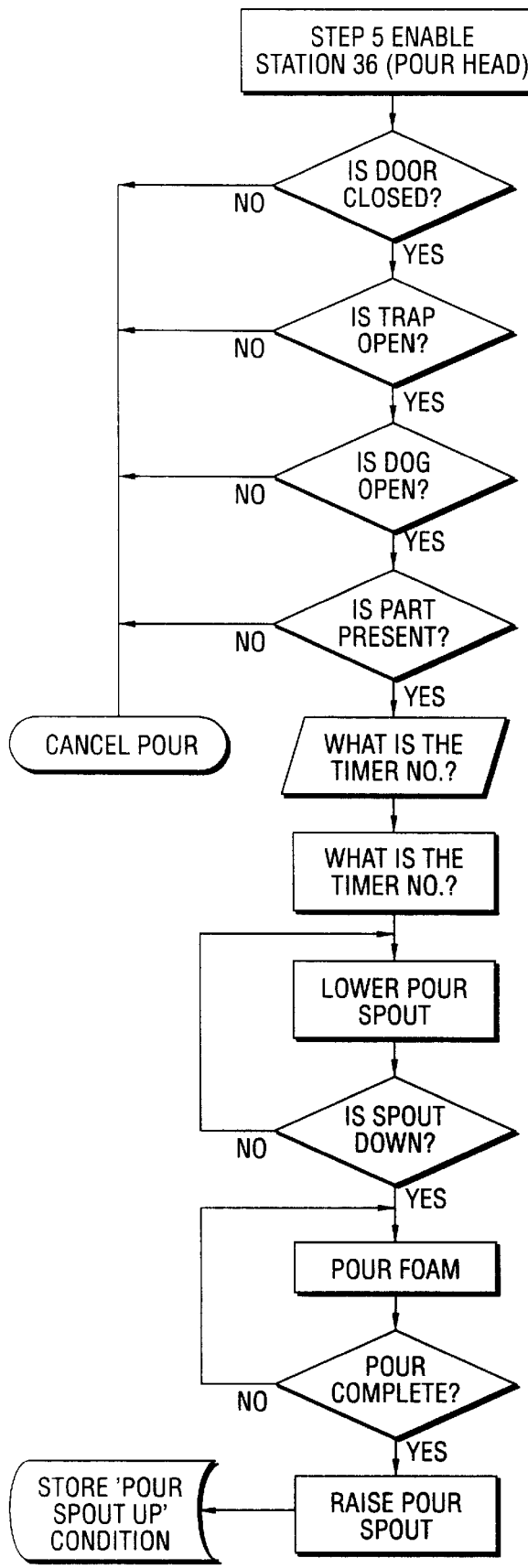
FIG. 9 is a flow chart of step 5 of the process illustrated in FIG. 8.
Figure 10:
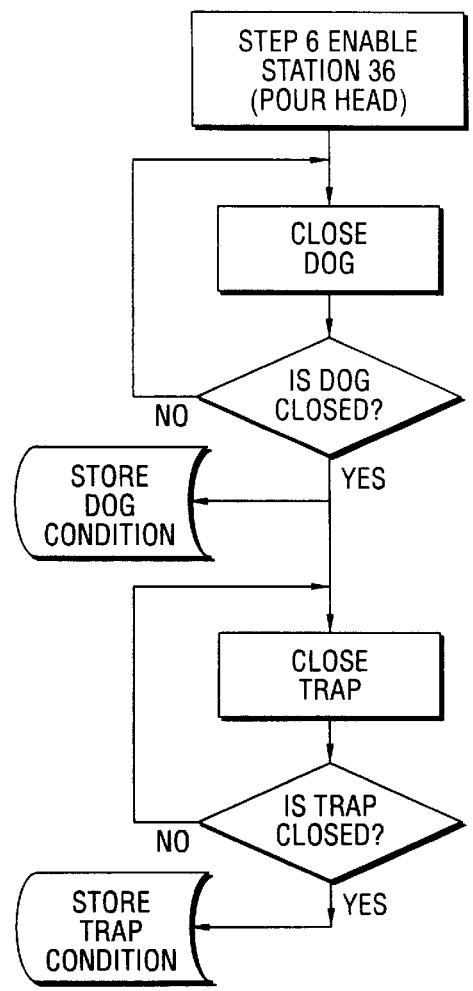
FIG. 10 is a flow chart of step 6 of the process illustrated in FIG. 8.
Figure 11:
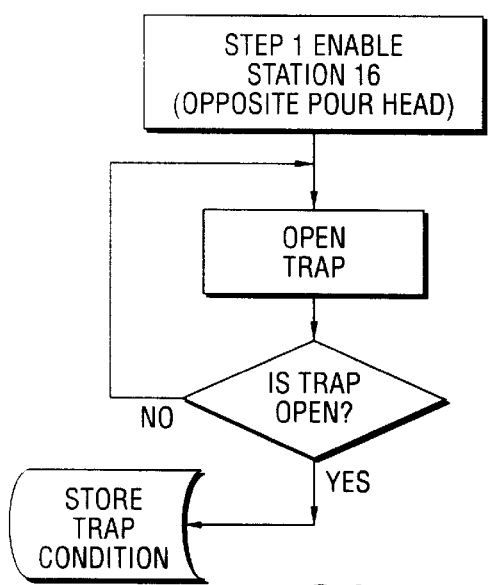
FIG. 11 is a flow chart of step 1 of the process illustrated in FIG. 8.
Figure 12:
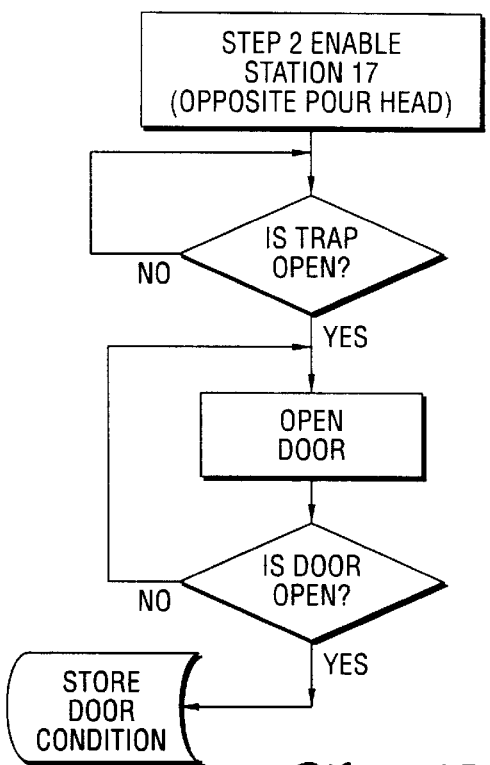
FIG. 12 is a flow chart of step 2 of the process illustrated in FIG. 8.
Figure 13:
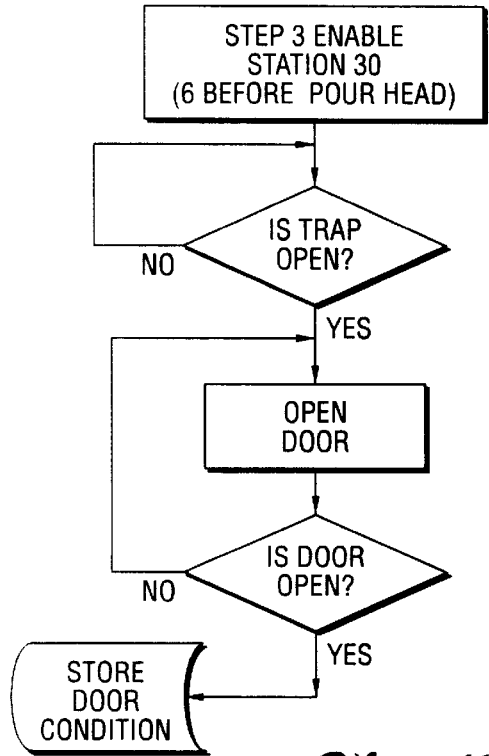
FIG. 13 is a flow chart of step 3 of the process illustrated in FIG. 8.
Figure 14:
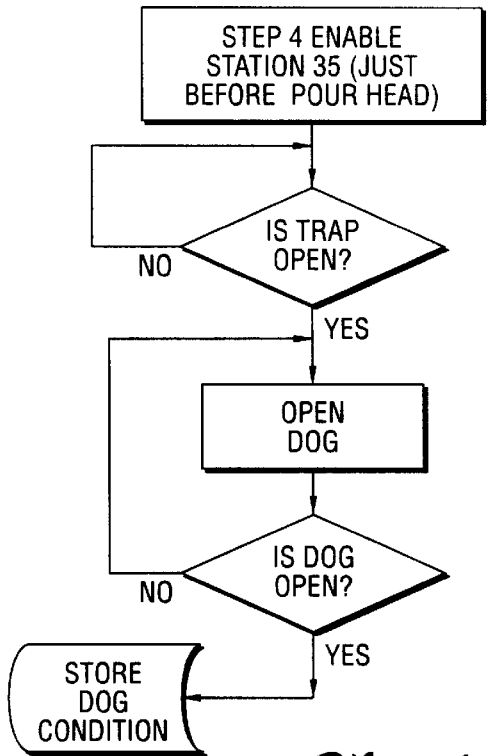
FIG. 14 flow chart of step 4 of the process illustrated in FIG. 8.

A schematic of one embodiment of the tool control is illustrated in FIG. 7. The tool control card 140 includes connection points 142 for connecting the tool control to the PLC 22 via a 16-wire bus 24 (shown in FIG. 1). These points serve as both inputs from the PLC to the tool control, as well as outputs from the tool control to the PLC. The 16-wire bus is connected to a pair of diode matrices 144 and 146 which prevent unwanted feedback to the bus. From there, the inputs and outputs to the bus 24 are interconnected to a series of control relays 76, 78, 80, 82, 84, and 86, switches connected, for example at inputs 88, 90, 92, 94, 96, 98, and 100, and jumpers (not shown) which are placed as hereinafter described to configure the tool control for a particular standard or nonstandard tool.

A pair of 10-position binary switches are preferably provided to serve as memory locations for two alternative foam pour times for this tool. One of these two timer circuits 102, 104 is preferably selected from the front panel 46 by switching the "com" terminal at 88 to either "A" or "B", thereby allowing for operator selection of either of two shot times for this tool.

The input lines (up to eight) from the bus 24 are connected through the diode matrices 144 and 76 via two four pole double throw control relays 82 and 84 when the control is switched to the automatic position. This provides a path for the motion signals transmitted by the PLC to be used as required by this tool. When all conditions of the tool are proper (i.e., relays 76, 78, and 80 are indicating, respectively, that the door is closed, the trap is open, and the dog is open, and the part present switch, and any supplementary switches for indication of any nonstandard conditions, are appropriately set), relay 86 pulls in. This removes the 24-volt DC voltage from wire number 9, thereby indicating that the part is present.

In one embodiment, a 16-line bus is utilized as follows:
- Line 1 is 24-volts DC;
- Line 2 is 0-volts DC;
- Lines 3–5 are reserved for the timer signals to the PLC from timer circuits 102 and 104;
- Line 6 is connected to the "door is closed" limit switch (# 1 at terminal block 116);
- Line 7 is connected to the "trap is open" limit switch (# 2 at terminal block 116);
- Line 8 is connected to the "dog is open" limit switch (# 3 at terminal block 116);
- Line 9 is connected to the "part not present" limit switch 90;
- Line 10 transmits the "close the door" signal from the PLC to control relay 76;
- Line 11 transmits the "open the door" signal from the PLC to control relay 76;
- Line 12 transmits the "close the trap" signal to control relay 78;
- Line 13 transmits the "open the trap" signal from the PLC to control relay 78;
- Line 14 transmits the "close the dog" signal to control relay 80;
- Line 15 transmits the "open the dog" signal to control relay 80; and
- Line 16 transmits the strobe signal across the bus.

It will be appreciated that the present invention may employ a bus consisting of any number of wires, each of which are assigned for the transmission of control and/or data signals as required by the particular machine control configuration. An advantage of the principal invention is, of course, that once a communication architecture is established for a particular central controller/multiple tool control system, the tool control of the present invention will allow for monitoring and control of a nonstandard tool without the need to reprogram the central control or change the central control-to-tool controller communications protocol.

As previously described, the timer source voltage is determined from either of components 102 or 104, depending on whether manual switch 88 is switched to shot time A or shot time B. In this manner, one of two alternative foam injection times can be manually selected by the operator and will be automatically provided when requested by the PLC.

In the standard tool shown in FIG. 4, the PLC provides motion signals to close and open the door, close and open the trap, and close and open the dog. Whether these motions are transferred to the tool solenoid valves, and if so, which valves, is determined by how the tool control card is configured to provide those outputs to the tool output lines 106. For transmission of a standard motion signal (e.g., door open) to open a door on a standard tool, a jumper would be placed between the "jumper-to-outputs" connection 108 of control relay 76, and the terminal 110 corresponding to the appropriate output line (three at 106). When jumped, the control signal "open door" transmitted by the PLC, will be forwarded through the jumper connection to the solenoid on the tool by the tool control. By not installing a jumper from the appropriate relay to the terminal of the appropriate output line, the automatic motion would be eliminated.

If a motion is removed from automatic, but that motion, or a motion for a nonstandard component, is required to be made manually, the jumper is omitted and a switch or push-button is directly connected to the terminal of the correct output line.

If both automatic movement and the ability to manually override is desired, the jumper is installed (for example, as described in connection with applying a jumper between terminals 108 and 110 to automatically transmit a door open command from the PLC), and an override switch or button is connected to the desired open (OP) or close (CL) terminals 112, 114, respectively, at the group labeled "optional override switches here". When a particular motion is configured as just described for manual override, by switching the manual override momentary switch connected, for example, at 100, the corresponding automatic control signals transmitted by the PLC are recognized by the board. The board is configured to transmit the status signals to the PLC so that the PLC has accurate status information whenever the auto/manual switch 90,91 is switched to automatic.

When a request is made by the PLC and the tool control is in the automatic mode, if jumpers are used in place of limit switches, a relay is energized and latched, providing the proper response to any inquiry as to the position of the nonexistent component. The relay remains in this latch position, i.e. the signal is retained until a request (in either automatic or manual mode) for the opposite motion is received.

In the illustrated embodiment, a two pole auto/manual switch is connected at 90 and 91. In the preferred embodiment, one pole disables all limit switches and/or timers providing output (i.e., feedback of component status and/or foam shot time) to the PLC. The other pole, when moved to manual, disables all outputs to the tool.

If the control is in automatic mode and a jumper for a selected standard component is not jumped (i.e., that standard component does not exist, or is not automatically controlled for this particular tool), a limit switch, rather than a jumper, can be installed at the location corresponding to that component at the "Limits or Jumpers" terminal block 116. When limit switches are used at 116, actual data is supplied to the PLC regarding the component's position. If a jumper is used, an artificial position is supplied when a movement is requested by the PLC.

The part present signal is enabled by a part (the presence of which in the tool is detected by a standard sensor), a signal generated as a result of all desired conditions met, or both. This signal is available from any desired combination of control relays 76, 78, or 80, plus any additional limit switches, or from a "part present" switch or from any combination of the relays, limit switches, and/or "part present" switch in series. The unused relays are jumped at the corresponding terminal pairs 118, 120, 122. When each condition for pouring foam is met, the combined contacts energize relay 86, which breaks the 24-volt DC signal to terminal No. 9 on the bus. Thus, in this embodiment, the part is shown as present at the lack of 24-volts DC on wire No. 9 of the main bus terminal strip.

Referring again to FIG. 7, the tool control card 140 can be easily reconfigured as described below to control nonstandard tool 60 (shown in FIG. 6). For this tool, the "close the door" signal is transmitted from the PLC to switch relay 76 to "close" (at 130), and thereafter transmitted from terminal 132 to the appropriate output (at 106) to activate the solenoid to close the door 62 on the tool. Similarly, the "open the door" signal transmitted from the PLC to control relay 76, switches the relay to "open" at 108 and the "open the door" signal is transmitted from terminal 110 to the corresponding output line to "open the door" 62.

It will be noted that, thus far, the control signals and responses for opening and closing the door 62 of the tool 60 are the same as the standard "open door" and "close door" control regime. However, the "open the dog" signal transmitted from the PLC, is sent to a suitable terminal, such as 136, for output from the tool control to activate the solenoid to clamp the door. It will be appreciated that the "open the dog" signal is utilized in this nonstandard tool to instead clamp the door since the timing of the receipt of this signal from the PLC coincides with an appropriate time to clamp the door in the molding process for this nonstandard tool. It will also be appreciated that a standard control signal can be utilized to control a nonstandard component by activating a timer which, for example, delays output of the control signal for some period of time suitable to then control a solenoid for a nonstandard component at the desired time.

In nonstandard tool 60, the "open the trap" signal transmitted by the PLC is sent, via terminal 138, as output to the appropriate solenoid to unclamp the door. Again, the standard signal has been chosen to be used to activate a nonstandard component (i.e., the door clamp), since the timing of the "open the trap signal" coincides with the time at which the door on nonstandard tool 60 should be unclamped. It will be appreciated that each of relays 76 and 80 are jumpered out at terminal block 116 to "fool" the PLC by automatically indicating that the dog is open and the trap is open (these components do not exist on this nonstandard tool), thereby indicating to the PLC that the conditions are met for foam injection at this tool.

Thus, the tool control may be quickly configured to support a nonstandard tool by reassigning the standard control signals sent by the PLC to perform other common nonstandard control functions, as desired, while utilizing jumpers, and/or control relays, as required, to indicate and report the status of the standard components (whether or not they exist on this tool) to the PLC.

While the simple architecture of the tool control card 140 of FIG. 7 has been found to be quickly and easily reconfigurable for a wide variety of nonstandard tools in the Allen-Bradley PLC-controlled multistation foam-in-place injection machine with which it is utilized, other alternative tool control card architectures may be utilized to provide more or less variability from standard central controller regimes, depending upon the standard control functions, the system design of the central controller, and the number of tool control functions required in other control/multistation machine configurations.

While the illustrated embodiment of the tool control utilizes conventional control relays, switches, and jumpers to integrate the status inquiry and control signals of the PLC with the status signals received by the tool control from the tool and the required control signals for the tool (whether standard or not), it will be appreciated that other control logic, such as a suitably programmed microprocessor, may be employed to perform one or more of the functions described herein.

The PLC control logic for one embodiment of the present invention is illustrated in FIGS. 8–14. This control logic is utilized for a 36-station carousel foam injection machine with the standard tool illustrated at FIG. 4 and described, having the previously described door, trap, and dog elements automatically controlled by the PLC.

It will be appreciated by those skilled in the art that the tool control illustrated in FIG. 7, or other similarly configured control card employing the tool-specific control methodology and structure of the present invention, provides the capability of adapting a nonstandard tool to an automatic multistation machine without the need to reprogram the PLC or modify the communication bus. It will also be appreciated that the tool control of the present invention can be simply and easily configured to act as a pass-through for a standard tool, merely implementing the control signals transmitted from the PLC to the tool and transmitting responses on the condition of standard tool components to the PLC as requested, as well as being configured to monitor and control independent operations for nonstandard tools while providing the necessary status signals to indicate to the PLC that standard conditions are appropriate for automatic operation of the nonstandard tool.

While the best mode for carrying out the invention has been described in detail, those familiar with the art to which this invention relates will recognize various alternative designs and embodiments for practicing the invention as disclosed by the following claims.

What is claimed is:

1. In a foam molding system including a plurality of positionable tools, at least one foam injection station, and a central controller including logic for monitoring a preselected set of conditions at each of the tools, and transmitting a set of control signals to position each tool at one of the injection stations and facilitate foam injection at each tool when appropriate, a tool-specific control associated with at least one tool comprising:

at least one input for receiving a first set of inquiry signals and a first set of control signals from the central controller;

at least one input for receiving signals indicating current selected conditions of the tool;

at least one output to the tool to actuate at least one selected component of the tool;

at least one output for transmitting signals to the central controller; and control logic for intercepting the first set of control signals from the central controller, generating a second set of control signals to activate at least one selected component of the tool, and for transmitting response signals to the central controller corresponding to the first set of inquiry signals, as required to confirm the status of the preselected conditions monitored by the central controller.

2. In a foam molding system including a plurality of standard and nonstandard, positionable tools, at least one foam injection station, and a central controller including logic for monitoring a preselected set of conditions at each of the tools, and transmitting a set of control signals to position each tool at one of the injection stations and facilitate foam injection at each tool when appropriate, a tool-specific control associated with at least one tool, the tool-specific control comprising:

at least one input for receiving a first set of inquiry signals and a first set of control signals from the central controller;

at least one input for receiving signals indicating current selected conditions of the tool;

at least one output to the tool to actuate at least one selected component of the tool;

at least one output for transmitting signals to the central controller; and control logic for passing, when the at least one tool is a standard tool, the first set of inquiry signals and the first set of control signals from the central controller to the at least one tool and response signals, corresponding to the first set of inquiry signals, confirming the status of preselected conditions from the at least one tool to the central controller and for intercepting, when the at least one tool is a nonstandard tool, the first set of control signals from the central controller, generating a second set of control signals to activate at least one selected component of the tool, and for transmitting response signals to the central controller corresponding to the first set of inquiry signals, as required to confirm the status of the preselected conditions monitored by the central controller.

3. The foam molding system as defined by claim 2, wherein the tool-specific control further includes a plurality of relays that receive and record control signals from the central controller and simulate preselected tool conditions.

4. The foam molding system as defined by claim 3, wherein the relays are latching relays.

5. The foam molding system as defined by claim 4, wherein the tool-specific control further includes a plurality of timers, each timer being connected to, and activated by, a manually operated electrical switch, each timer being set for a different interval to control foam injection duration when the switch to which it is connected is operated.

6. The foam molding system as defined by claim 5, wherein the tool-specific control further includes a plurality of diodes, at least one diode being connected in series with the at least one input for receiving signals from the central controller to isolate feedback to the central controller.

7. In a foam molding system including a plurality of standard and nonstandard, positionable tools, at least one foam injection station having a door, a trap, a dog and a pour spout; a central controller including logic for monitoring a preselected set of conditions at each of the tools and transmitting a set of control signals to position each tool at one of the injection stations and facilitate foam injection at each tool when appropriate; and, associated with at least one tool, a tool-specific control having at least one input for receiving a first set of inquiry signals and a first set of control signals from the central controller; at least one input for receiving signals indicating current selected conditions of the tool; at least one output to the tool to actuate at least one selected component of the tool; at least one output for transmitting signals to the central controller; and control logic for passing, when the at least one tool is a standard tool, the first set of inquiry signals and the first set of control signals from the central controller to the at least one tool and response signals, corresponding to the first set of inquiry signals, confirming the status of preselected conditions from the at least one tool to the central controller and for intercepting, when the at least one tool is a nonstandard tool, the first set of control signals from the central controller, generating a second set of control signals to activate at least one selected component of the tool, and for transmitting response signals to the central controller corresponding to the first set of inquiry signals, as required to confirm the status of the preselected conditions monitored by the central controller, a method for operating a tool; the method comprising the steps of:

(a) ensuring that the door is closed;

(b) ensuring that the trap is open;

(c) ensuring that the dog is open;

(d) ensuring that a part to be filled with foam is in position;

(e) determining which one of a plurality of foam injection durations has been selected;

(f) positioning the pour spout;

(g) ensuring that the pour spout is in position;

(h) pouring the foam;

(i) ensuring that the pour is complete;

(k) withdrawing the pour spout;

(l) closing the dog;

(m) ensuring that the dog is closed;

(n) closing the trap; and (o) ensuring that the trap is closed.

8. The method defined by claim 7, further including a step, following step (d), of canceling the pour if a part is not in position.

9. The method defined by claim 8, further including a step, following step (k), of recording the withdrawn condition of the pour spout.

10. The method defined by claim 9, further including a step, following step (m), of recording the closed condition of the dog.

11. The method defined by claim 10, further including a step, following step (m), of recording the closed condition of the trap.

* * * * *